United States Patent

Nojima et al.

[11] Patent Number: 6,103,347
[45] Date of Patent: Aug. 15, 2000

[54] MAGNETIC DISPLAY PANEL

[75] Inventors: Teruaki Nojima; Takao Yamaguchi; Sadao Tokorozawa, all of Hiratsuka, Japan

[73] Assignee: Kabushiki Kaisha Pilot, Japan

[21] Appl. No.: 08/848,157

[22] Filed: Apr. 29, 1997

[51] Int. Cl.$^7$ .................................. B32B 1/00; B43L 1/00
[52] U.S. Cl. .............................. 428/174; 346/21; 428/72; 428/76; 428/117; 428/119; 428/174; 428/900; 434/409
[58] Field of Search .................................. 428/68, 72, 76, 428/117, 119, 692, 900; 40/449; 434/409; 346/21

[56] References Cited

U.S. PATENT DOCUMENTS

| | | | |
|---|---|---|---|
| 4,143,472 | 3/1979 | Murata et al. ............................... | 35/66 |
| 4,368,952 | 1/1983 | Murata et al. ............................ | 350/362 |
| 4,536,428 | 8/1985 | Murata et al. ............................ | 428/117 |
| 4,643,684 | 2/1987 | Murata et al. ............................ | 434/409 |
| 5,771,039 | 6/1998 | Ditzik ....................................... | 345/178 |

*Primary Examiner*—Nasser Ahmad
*Assistant Examiner*—Derek Jessen
*Attorney, Agent, or Firm*—Rader, Fishman&Grauer

[57] ABSTRACT

An objective of the present invention is to provide a magnetic display panel capable of writing on both face and rear surfaces. A magnetic display panel, comprising a face substrate, a rear substrate, cell walls for forming a cell, for binding the face substrate and the rear substrate and for enclosing a dispersion liquid including a magnetic particle, wherein the cell walls having U-shaped cross sections are formed by bending and standing partially one or both of the face substrate and the rear substrate to almost 90 degrees, wherein a clearance of the U-shaped cross sections in each cell wall has an open angle of 0 to 20 degrees, wherein a base portion clearance of the U-shaped cross section is 0.1 mm to 1.0 mm, and wherein a top portion clearance of the U-shaped cross section is 0 to 1.0 mm.

9 Claims, 6 Drawing Sheets

MAGNETIC DISPLAY PANEL

BACKGROUND OF THE INVENTION

The present invention relates to a magnetic display panel, more particularly to a magnetic display panel where many cells are formed by cell walls obtained by partially bending and standing a substrate.

In a typical magnetic display panel utilizing magnetism to display, the panel is composed of a face substrate, a rear substrate and a honeycomb-shaped porous plate therebetween adhered by an adhesive agent, and a dispersion liquid where magnetic particles are dispersed is filled into enclosed spaces, that is cells, in the panel, and the magnetic particles are migrated from the rear substrate by a magnetic pen to act a magnetic field to display.

The multiple cell structure between the substrates of the magnetic display panel is to leave the magnetic particles in the dispersion liquid uniform between the substrates and to prevent an uneven distribution thereof. The thinner the side walls separating the cells are, the better continuous display is obtained.

However, use of the porous plate should be omitted to shorten a manufacturing process and to reduce a pasting process, because the porous plate is honeycomb-shaped and the honeycomb-shaped porous plate must be pasted to each face and rear substrate with an adhesive agent.

SUMMARY OF THE INVENTION

An object of the present invention is to provide a magnetic display panel forming a multiple cell structure between a face substrate and a rear substrate without using a conventional honeycomb-shaped porous plate, which is capable of displaying successively and distinctly when writing on one side of the two substrates.

The present invention relates to a magnetic display panel, which comprises a face substrate, a rear substrate and cell walls for forming a cell. The cell walls can also be used for binding the face substrate and the rear substrate. Further the cell are used for enclosing a dispersion liquid including a magnetic particle. The cell walls which have U-shaped cross sections can be formed by bending and standing partially one or both of the face substrate and the rear substrate to almost 90 degrees. A clearance of said U-shaped cross section in each cell wall may have an open angle of 0 to 20 degrees. A base portion clearance of said U-shaped cross section may be 0.1 mm to 1.0 mm, and wherein a top portion clearance of said U-shaped cross section may be 0 to 1.0 mm. A minute rough portion or a finely uneven area may be formed on a surface of a substrate between the cell walls formed by bending the substrate. Further, a protective sheet may be disposed on the substrate which forms separate walls by bending.

DETAILED DESCRIPTION OF PREFERRED EMBODIMENTS

Figure 11:
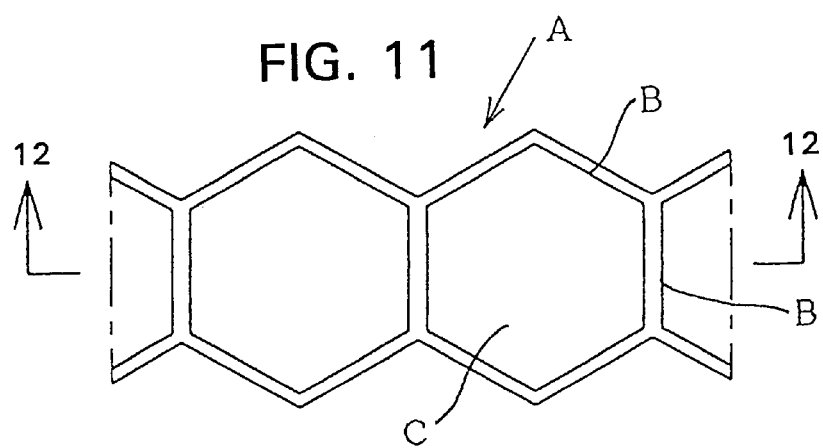
FIG. 11 is a fragmentary plan view of a mold of a vacuum apparatus of a substrate used for the present invention.
Figure 12:
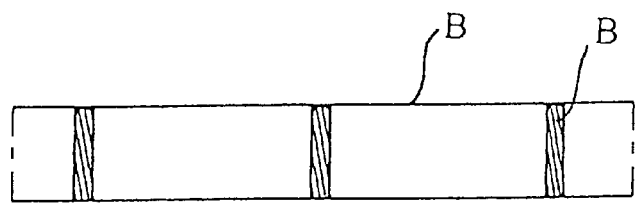
FIG. 12 is a sectional view of the mold used for the present invention shown along the line 12—12 in FIG. 11.
Figure 13:
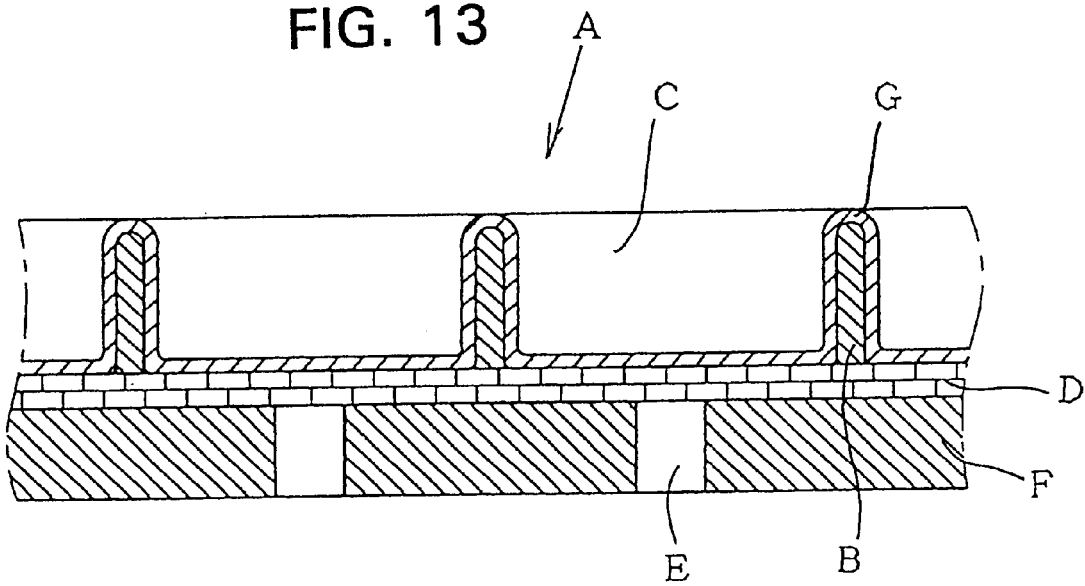
FIG. 13 is an explanation of forming a substrate using a vacuum forming apparatus used for the present invention.

To manufacture the panel according to the present invention, a porous mold A punching penetrating holes C except cell wall forming portions B as shown in FIG. 11 and FIG. 12 is disposed on a vacuum plate F formed suction holes E corresponding to each penetrating hole by interposing a ventilating member D having pores as shown in FIG. 13, a suction device (not shown) is disposed at the side of the vacuum plate F, a synthetic resin film G is coated on an opening surface of the mold A, and a vacuum forming is applied thereto.

Figure 14:
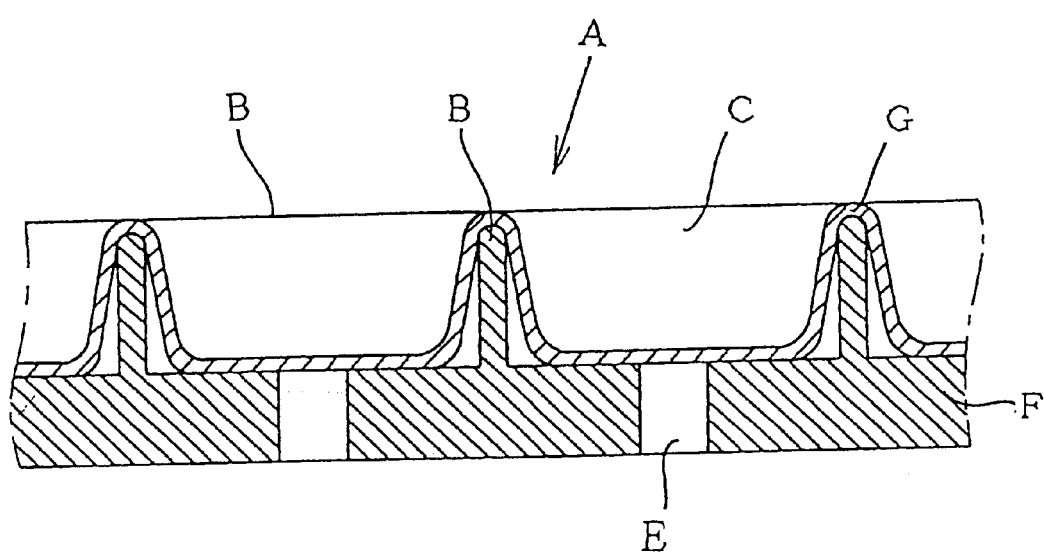
FIG. 14 is an explanation of forming by using a vacuum forming apparatus for comparison.

The vacuum forming using the ventilating member D was not known previously. If the vacuum forming without using the ventilating member D is conducted, the suction holes E are covered by the synthetic resin film G to be formed as shown in FIG. 14 causing a clearance between the film and the mold. Thereby the vacuum forming is not completely conducted causing a difference between a base portion clearance and a top portion clearance, resulting in a low display ability when writing.

On the other hand, if the vacuum forming using the ventilating member D, the synthetic resin film G is vacuumed via the ventilating member D to be no clearance between the cell wall forming portion and the synthetic resin film without covering the suction hole E with the synthetic resin film. As a result, the synthetic resin film G is adhered to the cell wall forming portion. Thereby, walls having U-shaped cross sections can bend and stand partially the substrate to almost 90 degrees to manufacture the substrate having a small difference between the base portion clearance and the top portion clearance.

Therefore, in the magnetic display panel according to the present invention, a thickness of the cell walls having the U-shaped cross sections separating the cells may become thinner, and achieve continuous display from both a substrate side with the cell walls and another substrate side. In addition, walls having the U-shaped cross sections can be bent and stood to almost 90 degrees, thereby a thickness of the cells can be thinner to be capable of having a cell volume equivalent to that of the conventional panel using a honeycomb-shaped porous plate. Therefore, a dispersion liquid including sufficient amount of magnetic particles required to display can be filled thereinto, resulting in a distinct display.

According to the present invention, the cell walls having the U-shaped cross sections are formed by bending and standing partially one or both of the face substrate and the rear substrate to almost 90 degrees. However, satisfactory result of clear display can not necessarily be obtained. If the clearance of the cell wall base portion is wide, the liquid dispersion, including the magnetic particles, is scarce. Thus a display from the substrate side with the cell walls can be adversely affected, and if the clearance of the top portion is too wide, a display from another substrate side can be also adversely affected. Consequently, it is important to make thin clearances of the base portion and the top portion of the cell walls having the U-shaped cross sections to obtain a continuous satisfactory display from one or both of the face and rear substrates.

Figure 2:
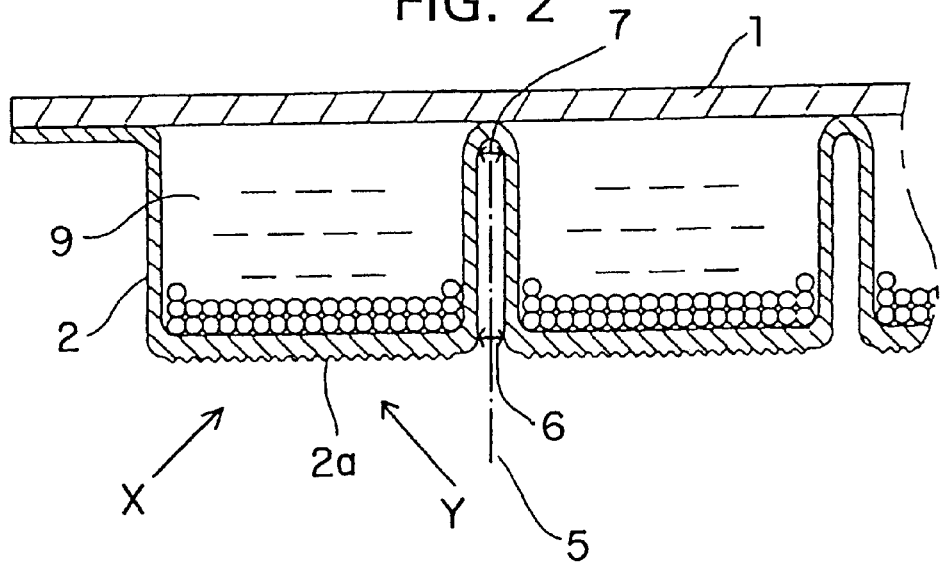
FIG. 2 is an enlarged sectional view of a principal portion of magnetic panel according to the present invention.

In case of displaying from the substrate with the cell walls, most of the display caused by migrating the magnetic particles in the dispersion liquid is normally seen from two optic angles of X direction and Y direction as shown in FIG. 2. The acuter the angles of both directions, the greater a continuity of the display is, because the magnetic particles migrated on the cell wall portions at a surface side of the substrate are visible. In fact, a predetermined distance between the panel and writer eyes, however, is needed. Therefore, the optic angle becomes obtuse when writing. If the clearance of the cell wall base portion and an open angle are out of a predetermined range, a broken line display is generated.

In case of displaying from the another substrate opposed to the substrate with the cell walls, the broken line display is generated as well, if the top portion clearance is out of a predetermined range.

As a result of experiments, it is found that a distinct and continuous display is obtained at both face and rear sides of the panel when the base portion clearance is not more than 1.0 mm, preferably within 0.5 mm, the top portion clearance is not more than 1.0 mm, preferably within 0.5 mm, and the open angle is not more than 20 degrees, and that the smaller the clearance and the angle are, the better the display is. It is preferable that the base portion clearance is 0.1 mm to 1.0 mm, the top portion clearance is 0 to 1.0 mm, and the open angle is 0 to 20 degrees. If the base portion clearance is less than 0.1 mm, it is difficult to form the cell walls.

Thus, if the cell walls having the U-shaped cross sections are formed by bending and standing partially one or both of the face substrate and the rear substrate to almost 90 degrees, the open angle of the clearance in the U-shaped cross section of each cell wall is 0 to 20 degrees, the base portion clearance is 0.1 mm to 1.0 mm, the top portion clearance is 0 to 1.0 mm, a distinct continuous display is constantly obtained when writing on whichever sides of the substrate.

According to one embodiment of the present invention, a substrate is bent to form cell walls. On the surface of this substrate between the cell walls, the surface is formed so that it is finely uneven. This imparts a frosted appearance on the surface of this substrate between the cell walls. Therefore an advantage of the present invention is that the occurrence of halation is reduced in the display.

According to another embodiment of the present invention, a protective sheet is disposed on a surface of the substrate where the cell walls are formed by bending, thereby a substrate contamination by mixing impurities between the substrate and the walls having the U-shaped cross sections can be prevented.

According to still another embodiment of the present invention, outer top portions of the cell walls contacted to another substrate by bending and standing are adhered to the substrate with adhesive agent, thereby an adhesion processing can be conducted at half the labor and time compared to an adhesion processing of adhering both surfaces of substrates having a conventional multiple cell structure.

The face substrate, the rear substrate and the protective sheet are preferably transparent, or can be semitransparent depending on applications, and various synthetic resins are applied thereto. The protective sheet is disposed on a surface of the substrate where the cell walls are formed by bending, or can be disposed on the substrate by adhering, thermal fusion welding, or accumulating separately.

The magnetic particle diameter is preferably not less than 10 microns. If the diameter is not more than 10 microns, an apparent diameter becomes not less than 10 microns by aggregating the magnetic particles in the dispersion liquid to bear a desired result.

In the dispersion liquid including the magnetic particles, the magnetic particles are dispersed in a colored liquid composed of a coloring agent, a dispersion medium and thickening agent as desired. If the thickening agent is added, a yield value can be added to the dispersion liquid. When a panel is produced using the liquid, distinct and high contrast letters and patterns can be displayed because only the magnetic particles receiving magnetism more than the yield value are migrated. The display can be retained stably for a long time and can be erased thoroughly without leaving a stain. About 10 to 40 parts by weight of the magnetic articles are mixed with 100 parts by weight of the colored liquid.

A typical thickening agent is micropowder silicic acid, but is not limited thereto. Various types of thickening agents may be used. The coloring agent is to provide a coverture and a tonality to the dispersion liquid. As the coloring agent, a white pigment, other dyestuffs of pigments may be used. As the dispersion medium, both polar solvents such as water, glycol or the like, and nonpolar solvents such as organic solvents, oil or the like can be used.

A method for manufacturing the panel according to the present invention is cited. As described above, the ventilating member D having pores is disposed at a bottom of the porous mold punching the penetrating holes except the cell wall forming portions, the ventilating member D is placed on the vacuum plate F having the suction holes E corresponding to each penetrating hole, the suction device is disposed at the side of the vacuum plate F, the opening surface opposed to the ventilating member D of the mold is coated with the synthetic resin film softened by heat, the suction device is worked to vacuum the mold, and the synthetic resin film is adhered to the inner wall of the mold and the ventilating member D to form the panel. No air exists in the mold due to a use of the ventilating member D. Therefore, the film and the mold are adhered completely. Consequently, the base portion clearance and the top portion clearance become smaller. After cooling, air is sent to the formed panel to take it.

Minute rough portions or finely uneven area formed on a surface of the substrate between the substrates are effective to be matted. The minute rough portions can be formed by a machining or by selecting the pores in the ventilating member D under vacuum forming.

As the ventilating member D, woven, non-woven, a foaming element having successive vents or the like is used.

The dispersion liquid including magnetic particles is flowed into the obtained substrate, the other substrate is adhered to the opening surface of the former substrate with a adhesive agent, and the protective sheet is disposed, as required, to the surface of the substrate with the cell walls to manufacture the panel.

The drawings of the present invention will be described in more detail.

Figure 1:
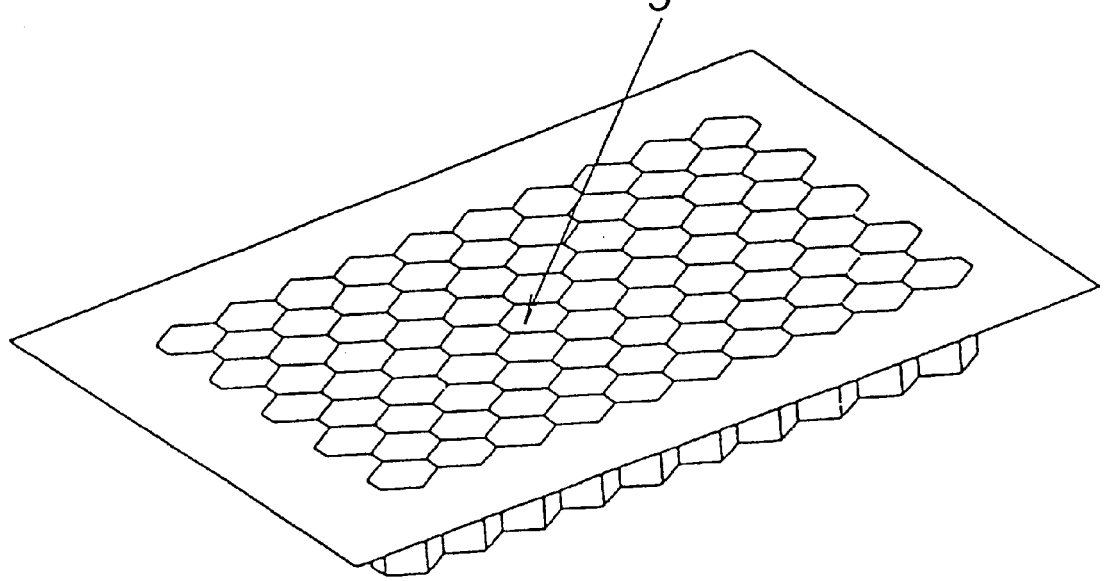
FIG. 1 is a plan view of a magnetic panel according to the present invention.

FIG. 1 shows a magnetic display panel having a face substrate 1, a rear substrate 2 and a multiple cell structure 3 forming a honeycomb-shaped cell therebetween where the dispersion liquid including the magnetic particles is enclosed.

FIG. 2 shows a magnetic display panel, where cell walls 4 having U-shaped cross sections are formed by bending and standing partially a rear substrate 2 to almost 90 degrees, an open angle of each cell wall having the U-shaped cross section is 0 degrees, a base portion clearance 6 is 0.1 mm, a top clearance portion 7 is 0.1 mm, an outer top portions 8 of the cell walls in the rear substrate 2 are adhered to a face substrate 1 with an adhesive agent, and a dispersion liquid 9 including the magnetic particles is enclosed in each cell. 2a represents minute rough portions or fine uneven area formed on a surface portion of the substrate between the cell walls 4 of the rear substrate 2.

Figure 3:
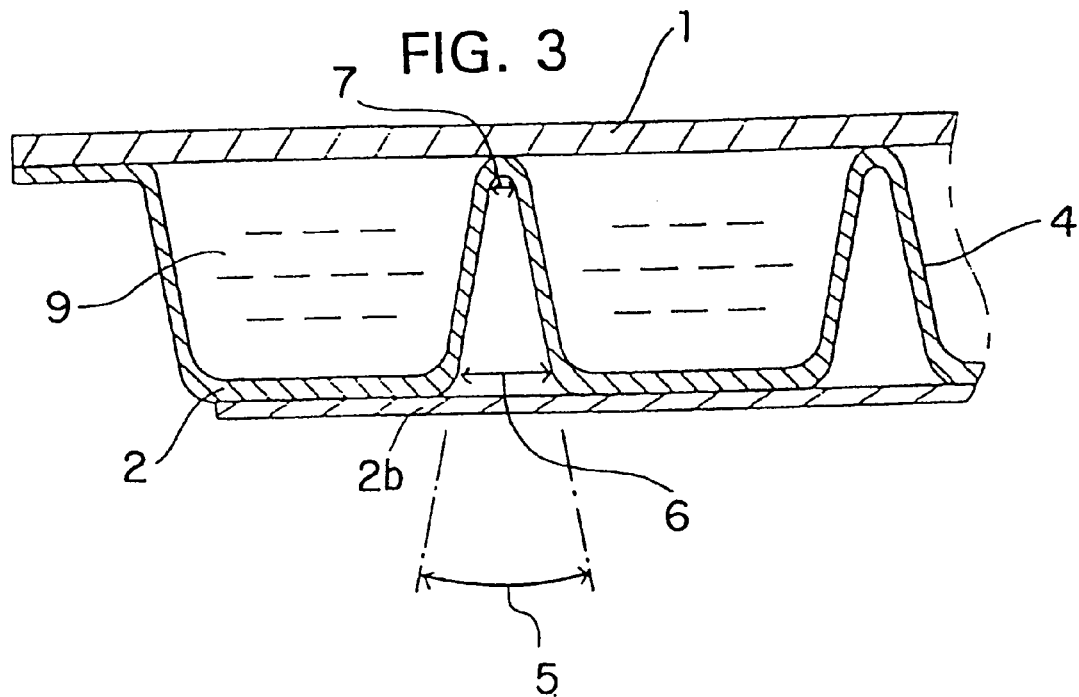
FIG. 3 is an enlarged sectional view of a principal portion of one embodiment of a magnetic display panel according to the present invention.

FIG. 3 shows a magnetic display panel, where cell walls 4 having U-shaped cross sections are formed by bending and standing partially a rear substrate 2 to almost 90 degrees, an open angle 5 of each cell wall 4 having the U-shaped cross section is 20 degrees, a base portion clearance 6 is 1.0 mm, a top clearance portion 7 is 0.1 mm, an outer top portions 8 of the cell walls in the rear substrate 2 are adhered to a face substrate with an adhesive agent, and a dispersion liquid 9 including the magnetic particles is enclosed in each cell. 2b represents protective sheet disposed on a surface of the rear substrate 2.

Figure 4:
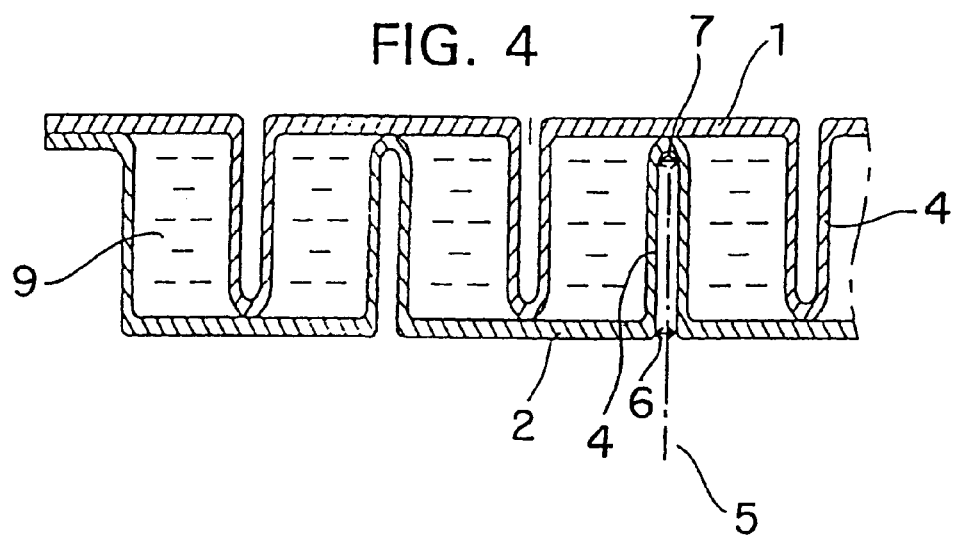
FIG. 4 is an enlarged sectional view of a principal portion of another embodiment of a magnetic display panel according to the present invention.

FIG. 4 shows a magnetic display panel, where cell walls 4, 4 having U-shaped cross sections are formed by bending and standing partially a rear substrate 2 to almost 90 degrees, an open angle 5 of each cell wall 4, 4 having U-shaped cross section is 0 degrees, a base portion clearance 6 is 0.1 mm, a top clearance portion 7 is 0.1 mm, outer top portions 8 of the cell walls in the rear substrate 2 and outer top portions 8 of the cell walls in the face substrate 1 are adhered to the face substrate 1 and the rear substrate 2 with an adhesive agent, respectively, and a dispersion liquid 9 including the magnetic particles is enclosed in each cell.

Figure 5:
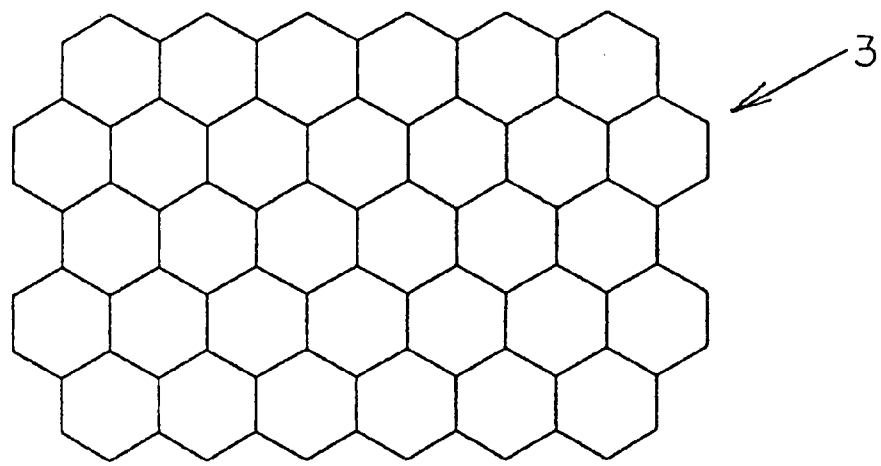
FIG. 5 is a fragmentary plan view of a multiple cell structure used for the present invention.
Figure 6:
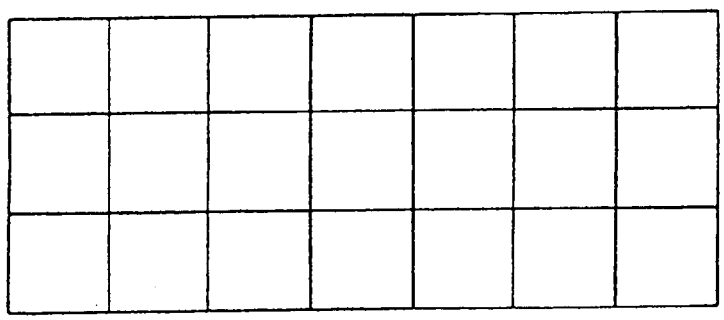
FIG. 6 is a fragmentary plan view of one embodiment of a multiple cell structure used for the present invention.
Figure 7:
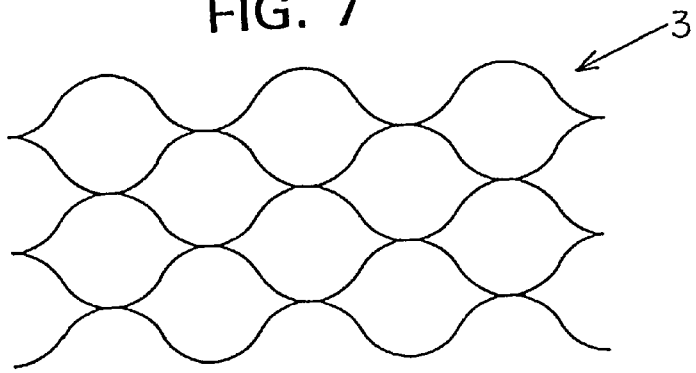
FIG. 7 is a fragmentary plan view of another embodiment of a multiple cell structure used for the present invention.
Figure 8:
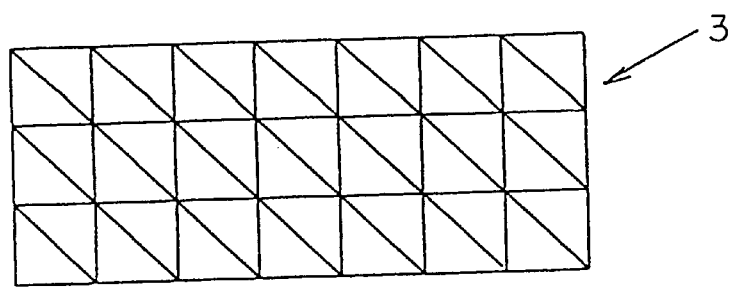
FIG. 8 is a fragmentary plan view of still another embodiment of a multiple cell structure used for the present invention.
Figure 9:
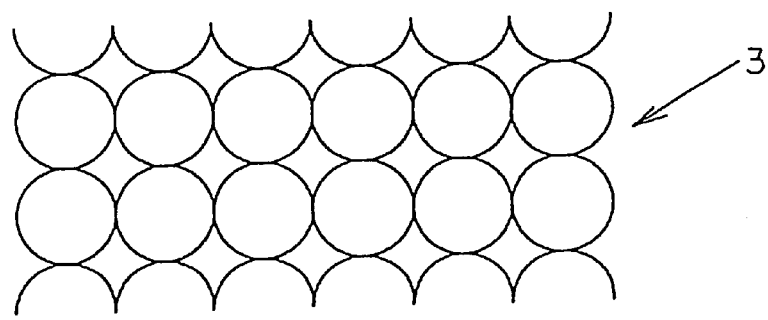
FIG. 9 is a fragmentary plan view of yet another embodiment of a multiple cell structure used for the present invention.

A shape of a honeycomb-like cell shown in FIG. 1 and FIG. 5 may be alternated with a rectangular form shown in FIG. 6 or with a spindle-like cell 3 that a plurality of wave form walls are lined and top portions of each wave form wall are fixed to next top portion of each wave form wall shown in FIG. 7. Or the shape may be alternated with triangle cell 3 shown in FIG. 8 or ring cell 3 shown in FIG. 9.

Figure 10:
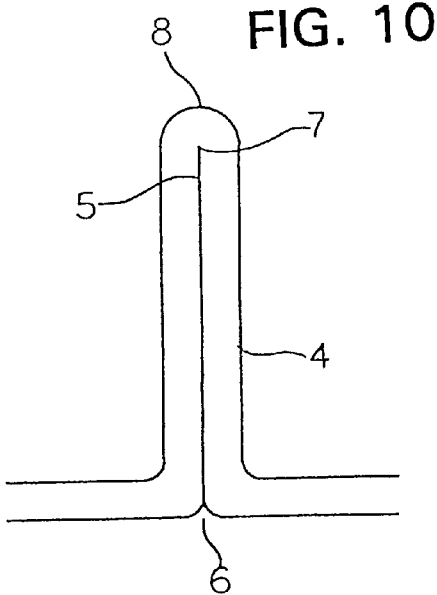
FIG. 10 is an explanation of an open angle, a base portion clearance, and a top clearance portion of a cell wall having U-shaped cross section used for the present invention.

FIG. 10 shows a substrate, where a cell wall 4 having a U-shaped cross section is formed by bending and standing partially to almost 90 degrees, an open angle 5 of each cell wall having the U-shaped cross section is 0 degrees, a base portion clearance 6 is 0.1 mm, a top clearance portion 7 is 0 mm. When forming the cell walls having the U-shaped cross section, a synthetic resin is contracted, thereby the open angle become 0 degrees.

FIG. 11 shows a part of a mold A. B represents a cell wall forming portion, and C represents a penetrating hole. The mold is, thus, a honeycomb-shaped.

FIG. 12 is a cross sectional view along the line 12—12 of the mold shown in FIG. 11.

FIG. 13 shows that a synthetic resin film G is applied a vacuum forming by using a vacuum forming apparatus composed of the mold A, the ventilating member D and a vacuum plate F. Suction holes E are disposed corresponding to each penetrating hole of the mold, and suck through the ventilating member D. Therefore, the suction holes E are never covered by the film.

FIG. 14 shows a vacuum forming without using the ventilating member D for comparison. The suction holes E are covered by the synthetic resin formed, thereby air is remained in the mold and a portion where the film and the mold are not adhered is generated. As a result, cell walls are formed having a big base portion clearance.

EXAMPLES

Examples of the present invention will be described.
(1) Preparation of a Dispersion Liquid
   (1-1) Dispersion Liquid A
   97 parts by weight of isoparaffin solvent, 2 parts by weight of micropowder silicic acid and 1 parts by weight of titanium oxide were mixed to be a white liquid. 40 parts by weight of magnetite and 25 parts by weight of a solid epoxy resin in 40% ethylmethylketone solution were then kneaded, dried and pulverized/dispersed to be black magnetic particles in 100 to 325 mesh. 20 parts by weight of the black magnetic particles were mixed with 100 parts by weight of the white liquid and dispersed therein to prepare a dispersion liquid.
   (1-2) Dispersion Liquid B
   A dispersion liquid was prepared, as dispersion liquid A, but 12 parts by weight of the magnetic particles were mixed with 100 parts by weight of the white liquid and dispersed therein.
(2) Production of a Substrate having Cell Walls
   (2-1) Substrate A
   A substrate made of a vinyl chloride resin was produced by a vacuum forming as shown in FIG. 11. In the obtained substrate, an open angle of a U-shaped cross section formed by bending and standing to 90 degrees in a cell wall was 0 degrees, a base portion clearance was 0.1 mm, and a top portion clearance was 0.1 mm. The cell is honeycomb-shaped, 4 mm square in area, 1.3 mm in height and 12.5 mm cubic in volume.
   (2-2) Substrate B
   A substrate made of a vinyl chloride resin was produced by a vacuum forming as shown in FIG. 11 to FIG. 13. In the obtained substrates an open angle of a U-shaped cross section formed by bending and standing to 90 degrees in a cell wall was 20 degrees, a base portion clearance was 1.0 mm, and a top portion clearance was 0.1 mm. The cell is honeycomb-shaped, 4 mm square in area, 1.3 mm in height and 11.0 mm cubic in volume.
   (2-3) Substrate C
   A substrate made of a vinyl chloride resin was produced by a vacuum forming as shown in FIG. 14. In the obtained substrate, an open angle of a U-shaped cross section in a cell wall was 60 degrees, a base portion clearance was 2.0 mm, and a top portion clearance was 0.1 mm. The cell is honeycomb-shaped, 4 mm square in area, 1.3 mm in height and 7.5 mm cubic in volume.

Example 1

The dispersion liquid A of the dispersion examples was filled into each cell of the substrate A with cell walls of the substrate examples. The vinyl chloride substrate having 0.1 mm in thickness (face substrate) was then adhered to other surface of the substrate (rear substrate) with an adhesive agent. The adhesive agent was filled therearound to produce a magnetic display panel.

Example 2

The dispersion liquid A was filled into the substrate B (rear substrate) with the cell walls of the substrate examples, as Example 1. The vinyl chloride substrate (face substrate) Was then adhered thereto with the adhesive agent. The adhesive agent was filled therearound to produce a magnetic display panel.

Comparative Example 1

The dispersion liquid A was filled into each cell of the substrate C (rear substrate) with the cell walls of the substrate examples, as Example 1. The vinyl chloride substrate (face substrate) was then adhered thereto with the adhesive agent. The adhesive agent was filled therearound to produce a magnetic display panel.

Comparative Example 2

The dispersion liquid B was filled into each cell of the substrate C (rear substrate) with the cell walls of the substrate examples, as Example 1. The vinyl chloride substrate (face substrate) was then adhered thereto with the adhesive agent. The adhesive agent was filled therearound to produce a magnetic display panel.

The magnetic panels produced as described above were evaluated about a display status. Written line on a face substrate or a rear substrate using a magnetic pen having a stick type ferrite permanent magnet (2.5 mm in diameter, 5 mm in length) with 1300 gauss was visibly observed from a distance of 30 cm. The evaluated result is represented by ⊚, ○ or X. ⊚ means that a black line is displayed distinctly against a white background with an excellent contrast and no broken line, ○ means that a black line is displayed distinctly against a white background with an excellent contrast and dimly a broken line but applicable to a practical use, and X means that a black line is broken or blurred, and not displayed distinctly against a white background with a low coverture and a resolution. The results are shown in Table 1.

shape, thereby a coverture of the display at the face substrate side is reduced. In addition, a distance from the magnetic pen and the magnetic particle layer comes to close due to a thicker magnetic particle layer. Thereby, many magnetic particles are easy to attract, resulting in a low resolution of the written line. In case of a display at the rear substrate side, the written line is broken due to a wide base portion clearance.

In Comparative Example 2, an amount of the magnetic particles is reduced in consideration of the resolution of the written line. In case of a display at the face substrate side, it is difficult for the magnetic particles to respond to a scanning by the magnetic pen causing a broken line.

As apparent from the above results, a distinct and continuous written line is obtained when the cell walls for use with the present invention have U-shaped cross sections formed by bending and standing partially one or both of said face substrate and said rear substrate to almost 90 degrees, and when U-shaped cross section clearance of each cell wall, a base portion clearance and a top portion clearance are within predetermined range, respectively.

According to the present invention, the cell walls having U-shaped cross sections are formed by bending and standing partially one or both of the face substrate and the rear substrate to almost 90 degrees, and U-shaped cross section clearance of each cell wall, a base portion clearance and a top portion clearance are within predetermined range, respectively. Thereby, a distinct continuous display can be constantly obtained when writing on whichever sides of the substrate.

What is claimed is:

1. A magnetic display panel, comprising:
    a face substrate;
    a rear substrate; and
    a cell wall which is formed by at least one of the face substrate and the rear substrate; wherein
    said cell wall stands at an angle of approximately 90 degrees with said substrate;
    said cell wall comprises a U-shaped cross section having an open angle, an base portion clearance and a top portion clearance, wherein
        said open angle is 0 to 20 degrees,
        said base portion clearance is 0.1 mm to 1.0 mm, and
        said top portion clearance is 0 to 1.0 mm.

2. A magnetic display panel according to claim 1, wherein a plurality of cell walls are formed by at least one of the face substrate and the rear substrate and at least one of substrates that forms the cell walls is uneven on the surface of the substrate between said cell walls.

TABLE 1

| | Open angle | Base portion (mm) | Top portion clearance (mm) | Cell volume m³ | Magnetic particles parts by weight | display status face substrate side | display status rear substrate side |
|---|---|---|---|---|---|---|---|
| Example 1 | 0 | 0.1 | 0.1 | 12.5 | 20 | ⊚ | ⊚ |
| Example 2 | 20 | 1.0 | 0.1 | 11.0 | 20 | ⊚ | ○ |
| Comparative Example 1 | 60 | 2.0 | 0.1 | 7.5 | 20 | x | x |
| Comparative Example 2 | 60 | 2.0 | 0.1 | 7.5 | 12 | x | x |

Note:
an amount of magnetic particles is represented parts by weight against 100 parts by weight of a white liquid in the table.

The open angle is 60 degrees and the base portion clearance is 2.0 mm in Comparative Example 1. Thereby, a bottom portion of the cell is narrowed, resulting in a small cell volume. If same amount of the magnetic particles as Example 1 is added thereto, a thickness of the white layer becomes thinner against a thickness of a magnetic particle layer because of the narrowed bottom portion of the cell 3. A magnetic display panel according to claim 1, wherein a protective sheet is disposed on said rear substrate on the substrate surface opposite that of the cell walls.

4. A magnetic display panel according to claim 1, wherein said wall, which is formed by the face substrate, further comprises an outer top portion which contacts the rear substrate.

5. A magnetic display panel according to claim 1, wherein wherein said wall, which is formed by the rear substrate, further comprises an outer top portion which contacts the face substrate.

6. A magnetic display panel, comprising:

a face substrate;

a rear substrate; and a cell wall which is formed by the face substrate and the read substrate, wherein said cell wall stands with an angle of approximately 90 degrees with said substrate;

said cell wall comprises a U-shaped cross section having an open angle, a base portion clearance and a top portion clearance, wherein said open angle is 0 to 20 degrees, said base portion clearance is 0.1 mm to 1.0 mm, and said top portion clearance is 0 to 1.0 mm.

7. A magnetic display panel according to claim 6, wherein a plurality of cell walls are formed by the face substrate and the rear substrate.

8. A magnetic display panel according to claim 1, wherein said display panel is viewable from either face or rear sides.

9. A magnetic display panel according to claim 6, wherein said display is viewable from both face and rear sides.

* * * * *